No. 661,221. Patented Nov. 6, 1900.
A. A. LOW.
SAP PAIL.
(Application filed Jan. 13, 1900.)
(No Model.) 2 Sheets—Sheet 1.
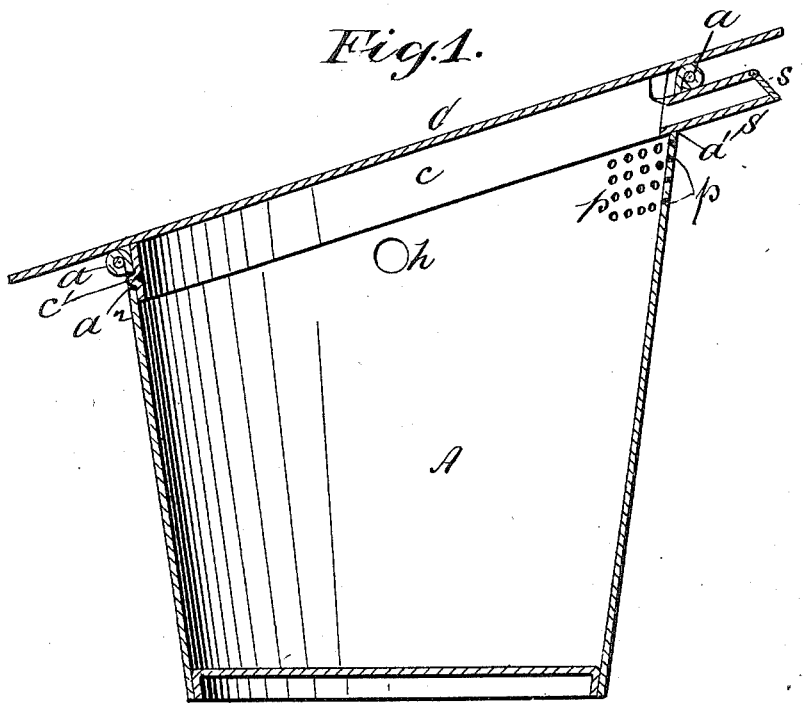
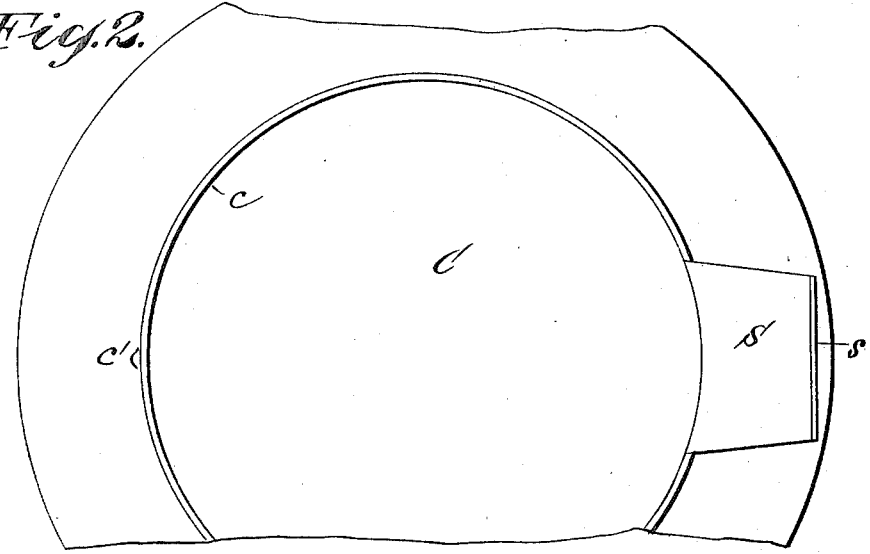
Witnesses:
O. W. Gardner
L. J. Shaw
Inventor:
Abbot Augustus Low
By his Attorney
George William Miatt No. 661,221. Patented Nov. 6, 1900.
A. A. LOW.
SAP PAIL.
(Application filed Jan. 13, 1900.)
(No Model.) 2 Sheets—Sheet 2.
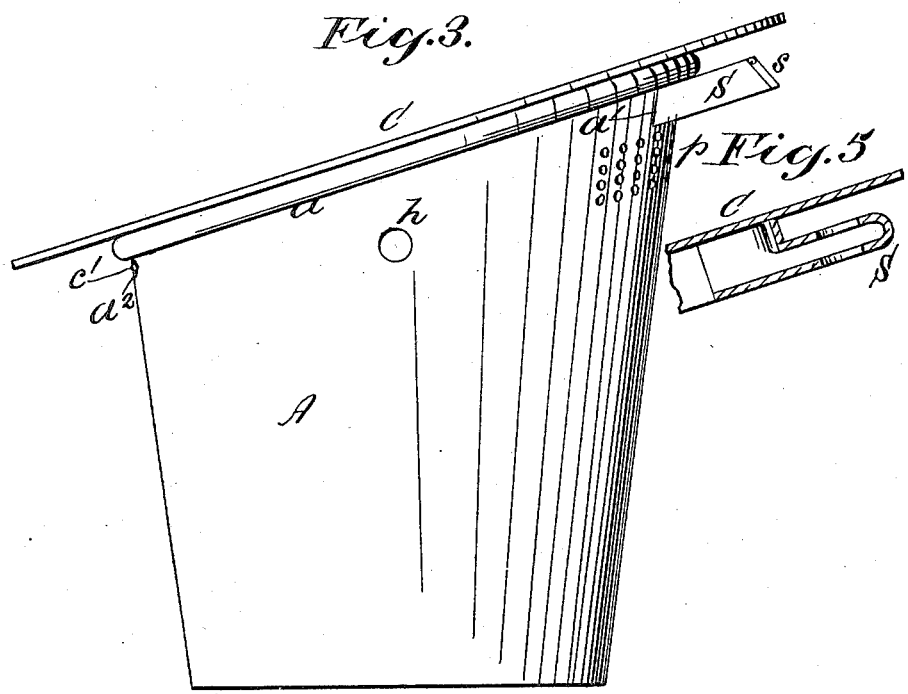
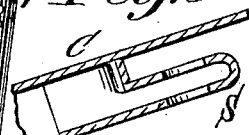
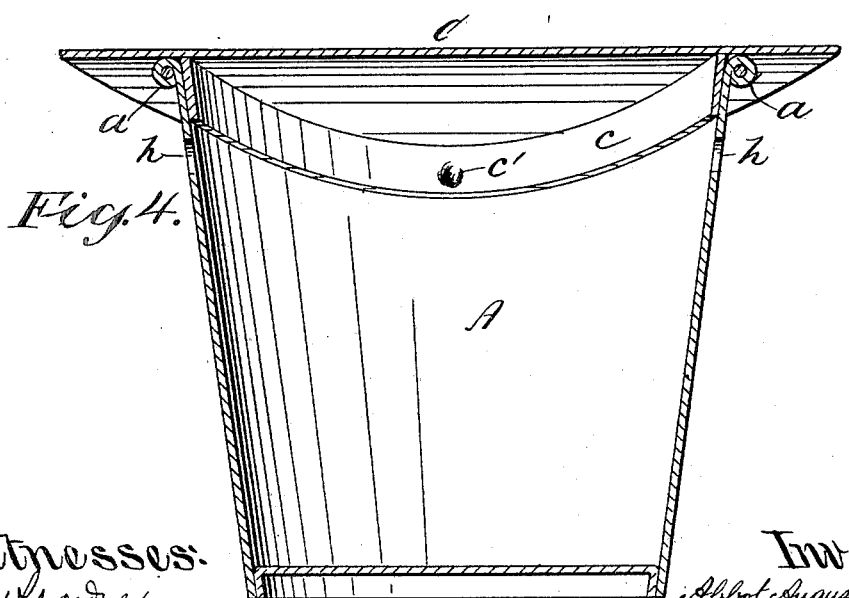
Witnesses:
D. W. Gardner.
L. T. Shaw.
Inventor:
Abbot Augustus Low
By his Attorney
George William Miatt

UNITED STATES PATENT OFFICE.

ABBOT AUGUSTUS LOW, OF NEW YORK, N. Y.

SAP-PAIL.

SPECIFICATION forming part of Letters Patent No. 661,221, dated November 6, 1900.

Application filed January 13, 1900. Serial No. 1,264. (No model.)

*To all whom it may concern:*

Be it known that I, ABBOT AUGUSTUS LOW, a citizen of the United States, residing in the city of New York, borough of Brooklyn, county of Kings, and State of New York, have invented certain new and useful Improvements in Sap-Pails, of which the following is a specification sufficient to enable others skilled in the art to which the invention appertains to make and use the same.

My present invention relates to sap-pails for the collection of maple-sap, &c.; and it consists, essentially, in the special construction and arrangement of the cover in combination with a sap-pail having an inclined rim. The object is to afford a cover that will not only exclude all extraneous matter from the interior of the pail, but will also shed such matter as fast as deposited thereon, and also to afford a convenient means of discharging the whole or a portion of the contents of the pail through the cover while in place.

Incidentally the invention includes the employment of an automatically-swinging protector for the mouth of the discharge-spout upon the cover.

In the accompanying drawings, Figure 1 is a central vertical section of my improved sap-pail and cover. Fig. 2 is a plan of the under side of the cover. Fig. 3 is an elevation of the pail and cover; Fig. 4, a vertical section taken at right angles to Fig. 1. Fig. 5 is a sectional view showing a modification in the form of spout.

The pail A is formed with the inclined rim $a$ and with a slot $a'$ at its upper extremity below said rim $a$. It is also formed, preferably, with a series of perforations $p$ for the purpose of ventilating the pail and aiding in the discharge of its contents, although this feature forms no part of my present invention, since it is described and claimed in my concurrent application filed herewith.

$h$ is the perforation by means of which the pail is suspended upon the sap-spout. The cover C consists of a flat plate of metal or other substance formed with the internal annular flange $c$ and with the discharge-spout S, which is adapted to project through the slot $a'$ in the body of the pail, and thereby lock the cover in position by reason of its engagement with the rim $a$. The outer end of the spout S is provided with a hinged cover $s$, which opens automatically when the pail is tilted to discharge its contents and closes automatically when the pail is again restored to its normal position.

The rim $c$ at the lower end of the cover is formed with a boss or protuberance $c'$, which engages with a hole or depression $a^2$, formed in the body of the pail just below the rim $a$, thereby acting in conjunction with the spout S to retain the cover in position and prevent any looseness or play thereof. The weight of the cover being thrown toward the lower end naturally tends to force the projection $c'$ into the hole or recess $a^2$. By this special construction and arrangement of parts I attain great simplicity and cheapness, while facilitating the engagement of the parts and the discharge of the sap.

In my concurrent application, Serial No. 1,265, I describe and claim a sap-pail having an inclined rim, said pail also being formed with perforations $p$ and having a cover C, interlocking with said rim, as in the present case, and I do not seek to cover such structure herein.

What I claim as my invention, and desire to secure by Letters Patent, is—

The combination of a sap-pail A, formed with the inclined rim $a$, and slot $a'$, with the flat cover C, formed with the flange $c$, underneath, having the spout S, adapted to project through the slot $a'$, in the body of the pail, for the purpose set forth.

ABBOT AUGUSTUS LOW.

Witnesses:
D. W. GARDNER,
GEO. WM. MIATT.